(12) United States Patent
Cathell et al.

(10) Patent No.: US 6,341,576 B1
(45) Date of Patent: Jan. 29, 2002

(54) SQUIRREL REPELLENT BIRD FEEDER

(75) Inventors: Philip Walton Cathell, Richmond; John Merrill Davis, III, Midlothian; Jane Dornbusch Davis, Midlothian; Francis Wendell Johnson, Midlothian; Louis Pitts Holt, III, Moseley; Boris M. Sverdlov; Mark Wayne Kitchen, both of Richmond; Laurence Edward Dockery, Midlothian; Ralph W. Effinger; John Merrill Davis, Jr., both of Richmond, all of VA (US)

(73) Assignee: ILS Corporation, Richmond, VA (US)

( * ) Notice: Subject to any disclaimer, the term of this patent is extended or adjusted under 35 U.S.C. 154(b) by 0 days.

(21) Appl. No.: 09/605,332

(22) Filed: Jun. 27, 2000

(51) Int. Cl.⁷ ............................................. A01K 31/00
(52) U.S. Cl. .................................................. 119/52.3
(58) Field of Search ................................ 119/52.2, 52.3, 119/57.8, 57.9, 428, 429, 459, 72

(56) References Cited

U.S. PATENT DOCUMENTS

| 3,590,780 A | * | 7/1971 | Dunbar | 119/52.3 |
| 4,102,308 A | * | 7/1978 | Kilham | 119/52.3 |
| 5,868,101 A | * | 2/1999 | Marshall | 119/428 |

* cited by examiner

Primary Examiner—Thomas Price

(57) ABSTRACT

A bird feeder equipped with an electrically powered spinning mechanism that is triggered by the weight of a squirrel on the feeder is described. Upon detection of a squirrel on the feeder, the spinning mechanism rotates the feeder at a rate adequate to centrifugally remove the invading squirrel while resulting in a minimum loss of feed contained in the feeder.

17 Claims, 1 Drawing Sheet

SQUIRREL REPELLENT BIRD FEEDER

FIELD OF THE INVENTION

The present invention relates to wild bird feeders and more particularly to a squirrel repellent such device.

BACKGROUND OF THE INVENTION

The feeding of wild birds is a popular pastime/hobby for many urban and suburban residents. Many bird-feeding devices have been developed to allow the convenient feeding of wild birds in easily observable exterior locations. In virtually all bird feeding environments, squirrels are a constant annoyance and pest as they invade bird feeders and compete with the birds for the available feed. Many times they drive the birds away and, in some cases, destroy or severely damage the bird-feeding device. Since squirrels are excellent jumpers, most manufacturers recommend locating the bird feeder at least ten feet from structures or other objects such as trees that squirrels can climb. This is not always possible, if the bird feeder is to remain located where the birds are readily observable from the inside of the home or office.

Accordingly, in order to meet and defeat the squirrel threat, many ingenious devices have been developed. Many of these remain readily defeatable by the squirrels because of their excellent jumping capabilities. Some such devices are described in the following U.S. Pat. Nos. 5,690,056, 5,535,835, 5,676,089, and 5,664,522. While the devices described in the foregoing patents all propose solutions to the problem, they are not fully satisfactory under all circumstances and are often defeated by squirrels.

Accordingly, there remains a need for a wild bird feeding device that is capable of repelling squirrels.

OBJECT OF THE INVENTION

It is an object of the present invention to provide a bird feeder that successfully repels squirrels attempting to feed therefrom.

SUMMARY OF THE INVENTION

According to the present invention, there is provided a bird feeder equipped with an electrically powered spinning mechanism that is triggered by the weight of a squirrel on the feeder. Upon detection of a squirrel on the feeder, the spinning mechanism rotates the feeder at a rate adequate to centrifugally remove the invading squirrel while resulting in a minimum loss of feed contained in the feeder.

DETAILED DESCRIPTION

Figure 1:
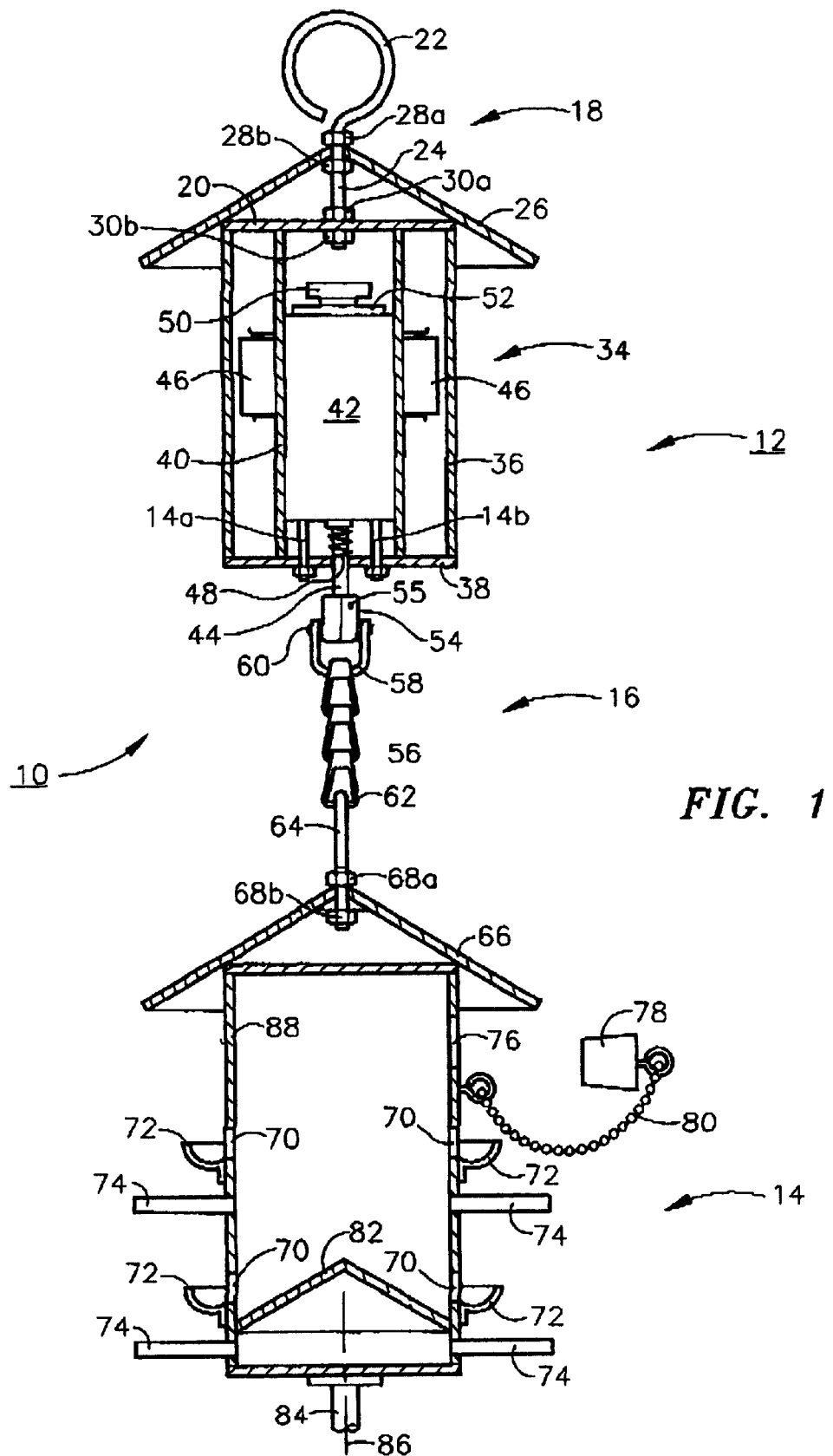
FIG. 1 is a partially cut-away side view of the squirrel repellent bird feeder of the present invention.

Referring now to FIG. 1 that depicts one preferred embodiment of the squirrel repellent bird feeder of the present invention, bird feeder 10 comprises two major members, a drive module 12 and a feeder 14 vertically connected by means of a shaft or other mechanism 16 that, as described hereinafter, is capable of transmitting rotary motion from drive module 12 to feeder 14. Drive module 12 comprises an attachment mechanism 18 for application to an overhead support such as a tree branch or other supporting structure. In the embodiment depicted in FIG. 1 attachment mechanism 18 comprises a threaded hook having a hook portion 22 for attachment to an overhead structure, tree branch or the like and A threaded shaft portion 24 securely, i.e. non-rotatably, attached directly or indirectly to top 20 and roof 26 of drive module 12. As shown in FIG. 1, such secure attachment may be provided by the tight application of nuts 28a and 28b to threaded shaft portion 24 on the upperside and underside of roof 26 respectively as well as nuts 30a and 30b on threaded shaft portion 24 on the inside and outside of top 20.

Drive module 12 comprises a housing 34 that includes top 20, cylindrical body 36 and bottom 38. Concentrically located within housing 34 is cylindrical support tube 40. Slideably located within support tube 40 is motor 42 that is allowed to travel vertically within support tube 40. Extending from the bottom of motor 42 and through bottom 38 is drive shaft 44 that transmits rotary motion to feeder 14 as described hereinafter. Retaining motor 42 in non-rotary position within support tube 40 are pins 14a and 14b that are threaded into the bottom of motor 42 but have smooth shafts in the areas thereof that pass through separate holes in bottom 38 to inhibit torque induced rotary motion of the motor relative to support tube 40 and housing 34 while permitting vertical movement of motor 42 within support tube 40 and rotation of drive shaft 44. Attached to the outside of support tube 40 are power supplies 46, in the embodiment depicted in FIG. 1, power supplies 46 are battery packs that are conventionally connected to motor 42 and electronic circuit board 52. As will be clear to the skilled artisan, if an external power source is readily and locally available, battery packs 46 may be omitted entirely without affecting the successful practice of the present invention. So long as adequate power is available to activate motor 42 and cause rotation of shaft 44 as described hereinafter, the particular power source used and its location are not particularly important to the successful practice of the present invention.

Linear force spring 48 preferably encompasses drive shaft 44 as shown in FIG. 1, and bears against the inside surface of bottom 38. Alternatively, linear force spring 48 could be mounted about an independent sliding shaft and engage the bottom of motor 42 and the inside surface of bottom 38 in a location remote from shaft 44. Linear force spring 48 is connected to displacement sensor 50 that in turn is mounted to electronic circuit board 52. Displacement sensor 50 transmits to electronic circuit board 52 signals representing the vertical displacement of motor 42 within support tube 40 induced by downward pressure on linear force spring 48 by virtue of downward pressure being applied to drive shaft 44 attached to feeder 14. Upon attainment of a predetermined vertical displacement, commensurate to the weight of a squirrel, electronic circuit board 52 closes a circuit to cause motor 42 to operate and provide rotary motion to drive shaft 44. The triggering weight causing engagement of motor 42 is above that of birds feeding on all of the perches as described below, but below that of an average squirrel.

As will be apparent to the skilled artisan, the above described motor activation circuit comprising linear force spring 48, displacement sensor 50 and electronic circuit board 52 could be replaced with a somewhat less accurate but functional activation circuit comprising a simple contact switch (not shown) at the base of motor 42. In this configuration, the simple contact switch would be closed when sufficient weight is placed on feeder 14 as to compress linear force spring 48 adequately to permit electrical contact in the contact switch and activation of motor 42. The disadvantage of such a method is that it must be periodically, (perhaps daily) adjusted to account for the declining weight of the feed as it is consumed.

A wide variety of mechanisms may be utilized to connect drive module 12 via drive shaft 44 to feeder 14. As long as whatever mechanism or connector is used properly imparts the rotary motion of motor 42 to feeder 14 it is contemplated as within the scope of the present invention. In the embodiment depicted in FIG. 1, connection of feeder 14 to drive shaft 44 is accomplished through the use of a shaft coupler 54 attached to drive shaft 44 using a conventional set screw arrangement. Drive shaft 44 is preferably D-shaped and includes an indentation that permits engagement of the set screw 55 with the indentation in drive shaft 44 to provide further support for the weight of pendant feeder 14. Again, according to the embodiment depicted in FIG. 1, a flat link chain 56, selected because of its ability to transmit rotational torque, is connected to drive shaft 44 via bracket 58 that is in turn connected to shaft coupler 54 via connecting link 60. Flat chain 56 allows the feeder and any clinging squirrel to rotate about their combined center of mass. Absent flat chain 56, the drive mechanism and its support must absorb the very large radial forces resulting from the off-center rotation. Lower end 62 of flat link chain 56 is in turn connected to attachment device at the top of feeder 14, in this case threaded eyebolt 64 that is attached to feeder roof 66 by nuts 68a and 68b threaded on threaded eyebolt 64 on the inside and outside respectively of feeder roof 66.

Feeder 14 may be of any conventional design, preferably cylindrical, the only unique requirement of the present invention being that feed outlets 70 be equipped with feed collection bowls 72 that inhibit dispersion of seed through feed outlets 70 due to centrifugal force when feeder 14 is rotated by motor 42 as described hereinafter.

Any number of feed outlets 70 may be provided and each is preferably equipped with a matching perch 74. Perches 74 are preferably fabricated from metal such as steel or aluminum and penetrate opposing surfaces of wall 88 for strength, as shown in FIG. 1. A feed supply hole 76 may be provided in wall 88 of feeder 14 as well as a stopper 78 that is attached to wall 88 of feeder 14 via a tether 80 for convenience.

According to a highly preferred embodiment of the present invention, feeder 14 includes at its bottom a conical structure 82 that prevents feed placed into feeder 14 from accumulating in the bottom thereof where it could become wet and produce fungal infections that could harm feeding birds. The presence of conical structure 82 forces the contained seed and any standing water toward the periphery of feeder 14 and the lowermost of feed outlets 70.

Optionally, according to a further preferred embodiment, a dynamic stabilizing rod 84 that provides additional mass along the axis of rotation 86 of feeder 14, thereby inhibiting horizontal motion of feeder 14 during rotation, may also be provided.

In use, bird feeder 10 is attached to a tree limb or other suitable overhead structural support after being filled with bird feed or seed. Upon a squirrel clinging to feeder 14 for purposes of obtaining feed therefrom, its weight on feeder 14 causes incremental compression of linear force spring 48 in direct proportion to its weight resulting in activation of displacement sensor 50 that provides a signal to electronic circuit board 52. Upon attainment of an appropriate change in weight, i.e. an appropriate displacement signal from displacement sensor 50, electronic circuit board 52 activates motor 42 using power from battery packs 46 thereby imparting rotary motion to drive shaft 44 and in turn feeder 14. Feeder 14 is caused to rotate at a rate, preferably about 100 revolutions per minute, adequate to cause the trespassing squirrel to be thrown off of feeder 14. This action can also provide entertainment for observing bird feeder owners as invading squirrels are rotationally removed from feeder 14. Repeated repelling of invading squirrels in this fashion will result in their losing interest in the feeder as a source of food.

As the invention as been described, it will be apparent to those skilled in the art that the same may be varied in many ways without departing from the spirit and scope of the invention. Any and all such modifications are intended to be included within the scope of the appended claims.

What is claimed is:

1. A squirrel repellent bird feeder comprising:
   A) a drive module comprising:
      I) a housing having a top, a bottom and at least one sidewall;
      II) a non-rotating attachment mechanism in said top for attachment to a tree limb or other supporting overhead structure;
      III) a cylindrical support tube located within and concentric with said housing;
      IV) a motor that can slide vertically within said support tube, said motor having a bottom and including a drive shaft extending from said motor bottom through said housing bottom;
      V) a linear force spring abutting said bottom of said motor and said bottom of said housing positioned to detect vertical motion of said motor;
      VI) a displacement sensor attached to said linear force spring for producing a signal upon detection of vertical motion which signal is transmitted to;
      VII) an electronic circuit board that upon reading an adequate displacement activates said motor; and
      VIII) a power supply for said motor;
   B) a connector that provides rotating attachment of said drive module to;
   C) a feeder having a periphery and including one or more feed outlets in said periphery each equipped with a feed collection bowl that inhibits the dispersal of feed from said feeder when said feeder is rotated by said motor.

2. The squirrel repellent bird feeder of claim 1 wherein said power supply is located within said drive module housing.

3. The squirrel repellent bird feeder of claim 1 wherein said drive module is cylindrical and said linear force spring encompasses said drive shaft.

4. The squirrel repellent bird feeder of claim 1 wherein said feeder has a bottom and further including a dynamic stabilizing rod extending downward from said bottom along the axis of rotation of said feeder.

5. The squirrel repellent bird feeder of claim 1 wherein said feeder has a bottom and a peripheral wall defining an interior portion and further including in said interior portion abutting said bottom an upward facing conical structure.

6. The squirrel repellent bird feeder of claim 1 wherein said drive shaft is D-shaped and includes an indentation for engaging a set screw in a shaft coupler attached to said drive shaft.

7. The squirrel repellent bird feeder of claim 1 wherein said power supply comprises at least one battery pack.

8. A squirrel repellent bird feeder comprising:
   A) a drive module comprising:
      I) a housing having a top, a bottom and at least one sidewall;
      II) a non-rotating attachment mechanism in said top for attachment to a tree limb or other supporting overhead structure;
      III) a support tube located within said housing;

IV) a motor that can slide vertically within said support tube, said motor having a bottom and including a drive shaft extending from said motor bottom;

V) a weight detection and motor activation system comprising:
  a) a linear force spring abutting said bottom of said motor and said bottom of said housing; and
  b) a mechanism for detecting a predetermined level of compression of said linear force spring and closing a circuit when said predetermined level of compression has been attained causing activation of said motor;

VI) a power supply for said motor;

B) a connector that provides rotating attachment of said drive module to;

C) a feeder having a periphery and including one or more feed outlets in said periphery each equipped with a feed collection bowl that inhibits the dispersal of feed from said feeder when said feeder is rotated by said motor.

9. The squirrel repellent bird feeder of claim 1 wherein said drive shaft is D-shaped and includes an indentation for engaging a set screw in a shaft coupler attached to said drive shaft.

10. The squirrel repellent bird feeder of claim 1 wherein said power supply comprises at least one battery pack.

11. The squirrel repellent bird feeder of claim 1 wherein said support tube is cylindrical and said drive shaft extends through said housing bottom.

12. The squirrel repellent bird feeder of claim 1 wherein said power supply is located within said drive module housing.

13. The squirrel repellent bird feeder of claim 8 wherein said drive module is cylindrical and said linear force spring encompasses said drive shaft.

14. The squirrel repellent bird feeder of claim 8 wherein said feeder has a bottom and further including a dynamic stabilizing rod extending downward from said bottom along the axis of rotation of said feeder.

15. The squirrel repellent bird feeder of claim 8 wherein said feeder has a bottom and a peripheral wall defining an interior portion and further including in said interior portion abutting said bottom an upward facing conical structure.

16. The squirrel repellent bird feeder of claim 8 wherein said support tube is cylindrical and said drive shaft extends through said housing bottom.

17. A squirrel repellent bird feeder comprising:
  A) a drive module comprising:
    I) a housing having a top, a bottom and including a cylindrical support tube;
    II) a non-rotating attachment mechanism in said top for attachment to a tree limb or other supporting overhead structure;
    III) a motor that can slide vertically within said support tube, having a bottom non-rotatably mounted within said housing, concentric with said housing and including a drive shaft extending from said motor bottom through said housing bottom; and
    IV) a power supply for said motor;
  B) a connector that provides rotating attachment of said motor and said drive module to;
  C) a feeder having a periphery and including one or more feed outlets in said periphery each equipped with a feed collection bowl that inhibits the dispersal of feed from said feeder when said feeder is rotated by said motor; and
  D) a motor activation mechanism comprising;
    1) a linear force spring abutting said bottom of said motor and said bottom of said housing positioned to detect vertical motion of said motor;
    2) a displacement sensor attached to said linear force spring for producing a signal upon detection of vertical motion which signal is transmitted to; and
  E) an electronic circuit board that upon reading adequate displacement activates said motor.

* * * * *